United States Patent [19]
Kulhawik et al.

[11] Patent Number: 5,356,165
[45] Date of Patent: Oct. 18, 1994

[54] BICYCLE INCORPORATING BIFURCATED FRAME

[76] Inventors: Joseph E. Kulhawik, 10636 Landale St., North Hollywood, Calif. 91602; Thomas E. Lee, 11661 Pendelton St., Sun Valley, Calif. 91352

[21] Appl. No.: 78,351
[22] Filed: Jun. 21, 1993
[51] Int. Cl.⁵ ............................................... B62K 3/02
[52] U.S. Cl. .................................. 280/275; 280/283; 280/284
[58] Field of Search ............... 280/275, 283, 284, 285, 280/286, 288

[56] References Cited

U.S. PATENT DOCUMENTS 4,046,396  9/1977  Taylor et al. .................. 280/284

FOREIGN PATENT DOCUMENTS

| 0164930 | 9/1904 | Fed. Rep. of Germany | 280/283 |
| 0446263 | 3/1949 | Italy | 280/284 |
| 7412856 | 9/1973 | Netherlands | 280/283 |
| 1283147 | 1/1987 | U.S.S.R. | 280/284 |

Primary Examiner—Margaret A. Focarino
Assistant Examiner—Anne Marie Boehler
Attorney, Agent, or Firm—Michael A. Painter

[57] ABSTRACT

A bicycle, motorcycle or the like is fabricated from a pair of frame sections. A front frame section includes the front fork and wheel, handlebar assembly and seat. A rear frame section includes the crank assembly, pedal assembly and the rear stays and wheel. A shock absorber resiliently couples the front and rear frames to one another intermediate the crank assembly and seat. The lower terminus of the shock absorber is secured to a center support stay of the rear frame, the upper terminus of the shock absorber being coupled to one plurality of selectable locations on a diagonal support of the front frame. The point of coupling alters the relative stiffness of the suspension to compensate for the load imposed on the bicycle seat. The front and rear frames are pivotally coupled to one another forwardly from the lower terminus of the shock absorber in a manner which will permit adjustment of the force required to activate the suspension.

5 Claims, 2 Drawing Sheets

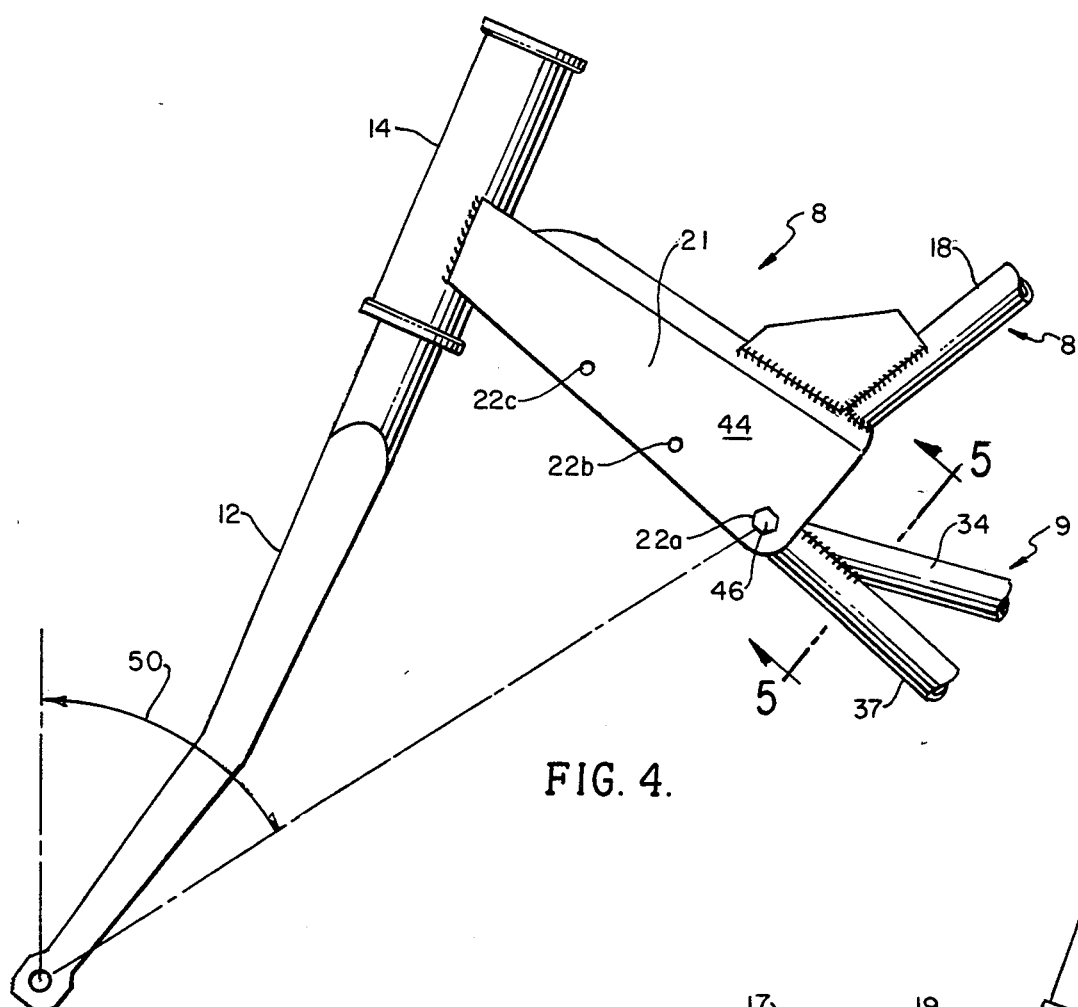
FIG. 4.
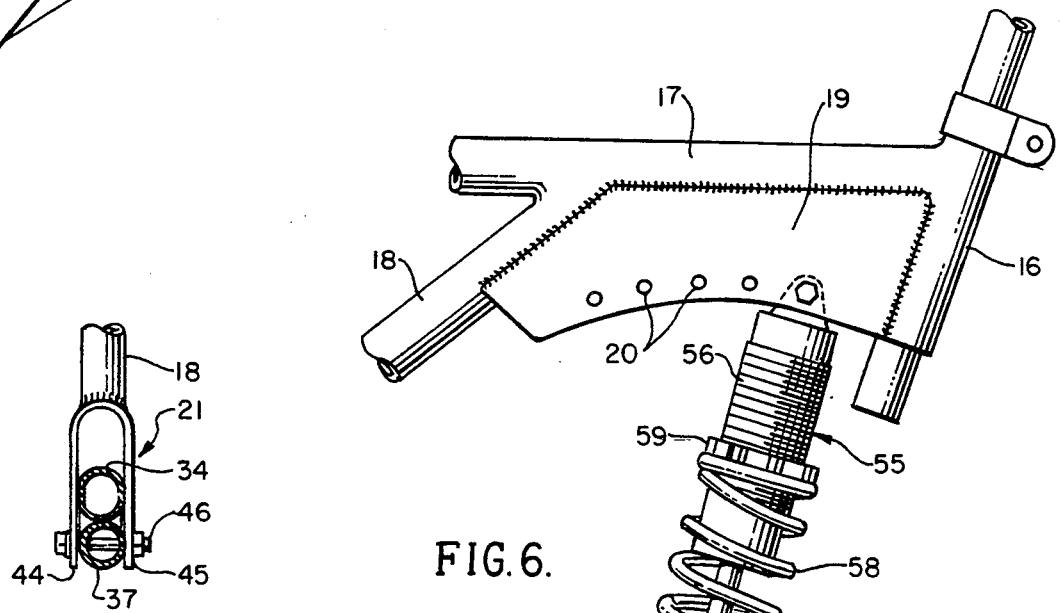
FIG. 5.
FIG. 6.

BICYCLE INCORPORATING BIFURCATED FRAME

BACKGROUND OF THE INVENTION

1. Field of the Invention

The present invention generally relates to a suspension system for a two-wheeled vehicle and, more particularly, to a vehicle employing bifurcated frame sections incorporating a resilient coupling therebetween.

2. Prior Art

The prior art discloses many designs for bicycles, light motorcycles and the like, all of which attempt to provide adjustable suspensions. Although it is understood the present invention is applicable to any type of two wheeled vehicle, for exemplary purposes the present invention shall be described with respect to a pedal driven bicycle.

The problems inherent in bicycle construction relate to the suspension or shock absorption capabilities as well as performance characteristics. A motor driven cycle taught by the prior art provides for a bifurcated frame having a fixed coupling intermediate the front and rear frames. To stabilize the suspension, a shock absorber is mounted intermediate the front and rear frames beneath the seat and a diagonal support of the rear frame. The problems inherent in this design relate to its inapplicability to a pedal driven bicycle. Since the front and rear frames are coupled at a fixed location, it fails to provide any means to deactivate the suspension.

A pedal driven bicycle must include means for deactivation of the suspension while pedaling yet permit activation on rough terrain when the user is not rotating the pedals. The present invention has solved this problem by providing for a selectively, adjustable coupling between the front and rear frames. By permitting adjustment of the structural coupling between the front and rear frames, the orientation of a shock absorbing member relative to the axis of the crank and pedals may be changed. Furthermore, by changing the axis of movement of the shock absorbing member, the force necessary to activate the suspension may be altered.

Another device taught by the prior art provides for front and rear frames which are pivotally connected directly adjacent the axis of rotation of the crank and pedal assembly. A horizontally disposed shock absorbing member is coupled between the front and rear frames forwardly of the seat support. As the front and rear frames pivotally change position relative to one another in response to the underlying terrain, the shock is absorbed by the resilient coupling of the shock absorber. This design exemplifies one of the problems inherent in bicycle construction. Where bicycles employ bifurcated frames as part of a system for absorbing shock, it is necessary to prevent the pedals from coming in contact the ground. This is generally referred to as "pedal droop." This problem may occur when the rotating crank and pedal assemblies are vertically deflected independent of the rear wheel.

In the device described by the prior art, the front frame and rear frame pivot about a point rearwardly of the crank assembly thereby allowing the crank and rotatable pedal assembly to vertically change position relative to the axis of the rear wheel. Pedal droop will occur if the vertical change of position of the crank and pedal assembly is excessive relative to the rear wheel. The present invention resolves the problem of pedal droop by utilizing a rear frame which stabilizes the position of the crank and pedal assembly relative to the rear wheel. Since the present invention utilizes a pivotal coupling intermediate the front and rear frames which is forwardly of the shock absorbing member, the problem of pedal droop is fully alleviated.

The present invention solves those problems left unresolved by the prior art by altering the manner in which the front and rear bicycle frames are coupled to one another. The bicycle is comprised of a bifurcated frame assembly. The front frame includes the front fork and wheel, handlebar and steering assembly and the seat. The seat is coupled to the steering assembly by a top tube, a diagonal support tube being extended forwardly and downwardly therefrom. A supporting plate secures the diagonal support tube to the steering assembly. The support plate provides a plurality of alternative pivot points to which the rear frame may be coupled. The rear frame is generally triangular and includes the crank and pedal assemblies, extending rear arms, coaxial rear and center stays and the rear wheel. The crank assembly is joined to the forward terminus of the center stay by a diagonal down tube. At the forward intersection between the center stay and diagonal down tube the rear frame is pivotally coupled to the support plates of the front frame. A shock absorbing member is mounted between the intersection of the center and rear stays of the rear frame and the diagonal support tube of the front frame. By adjusting the position at which the upper end of the shock absorber is secured to the diagonal support tube, the suspension may be adjusted to compensate for the force imposed on the bicycle seat (i.e., weight of the rider). By changing the position of the pivotal coupling intermediate the front and rear frames, the force necessary to activate the shock absorbing suspension may be changed thereby improving performance characteristics.

SUMMARY OF THE INVENTION

The basic idea of the present invention is a bicycle which is bifurcated into a front frame and a rear frame. The front frame generally comprises the front wheel, front fork, handlebar and steering assembly and the seat. The rear frame generally comprises the crank and pedal assemblies, rear stays and rear wheel. The present invention is achieved by the structure of the front and rear frames and the manner in which the front and rear frames are coupled to one another.

The seat for the bicycle is coupled to the steering assembly by a horizontal top tube which extends therebetween. A diagonal support tube extends generally from the seat post forwardly, the end thereof being coupled to the steering assembly by a support plate which provide for a selectable pivot point between the front and rear frames.

The rear frame comprises a substantially triangular structure. The crank and pedal assemblies are coupled to the rear wheel by a pair of extending rear arms which lie on either side of the rear wheel. A center stay axially extends rearwardly into a pair of rear stays which lie on either side of the rear wheel. A vertical front stay connects the pedal and crank assemblies to the intersection of the center stay and rear stays. A diagonal down tube connects the pedal and crank assembly to the forwardmost terminus of the center stay.

The rear frame is pivotally coupled to the front frame at the support plate. At the intersection between the center stay and diagonal down tube of the rear frame, a pivotal coupling is formed which will determine the force needed to activate the suspension. The angle between the frame coupling and a vertical plane extended through the center of the front wheel must not exceed 60° of arc. To provide shock absorption, a resilient coupling in the form of a shock absorber is mounted between the intersection of the center and rear stays of the rear frame and the diagonal support tube of the front frame. The selected position of the upper mounting between the shock absorber and the diagonal support tube provides the ability to compensate for the weight imposed on the bicycle seat thereby allowing one to adjust the degree of stiffness of the suspension.

It is an object of the present invention to provide an improved construction for a bicycle.

It is another object of the present invention to provide a bifurcated frame for a bicycle which improves performance characteristics.

It is still another object of the present invention to provide a bicycle frame which provides for adjustable suspension while maintaining a fixed relationship between the pedal assembly and rear wheel.

It is still yet another object of the present invention to provide an improved bicycle frame which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

FIG. 4 an enlarged view of the pivotal coupling between the front frame and rear frame of the present invention.

FIG. 5 is a cross-sectional view of the pivotal coupling intermediate the front and rear frames of the present invention taken through line 5—5 of FIG. 4.

FIG. 6 is an enlarged view illustrating the shock absorbing member intermediate the front and rear frames of the present invention.

DESCRIPTION OF THE PRESENTLY PREFERRED EMBODIMENT

Figure 1:
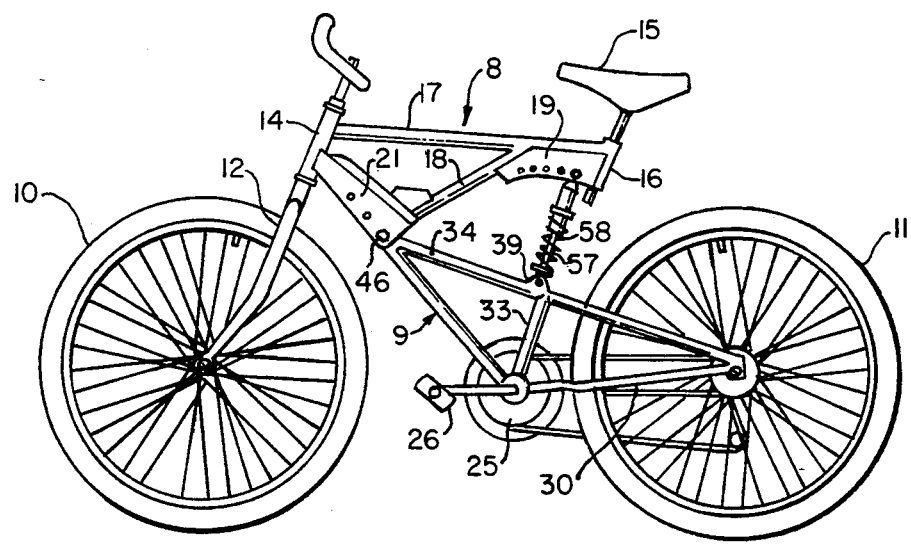
FIG. 1 is a side elevation view of a bicycle constructed in accordance with the present invention.
Figure 2:
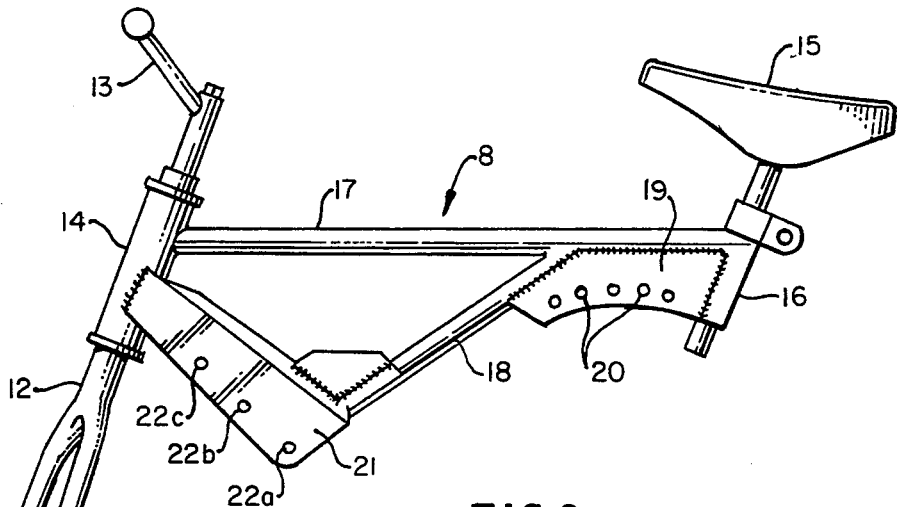
FIG. 2 is a perspective view of the front frame of the present invention shown in FIG. 1.
Figure 3:
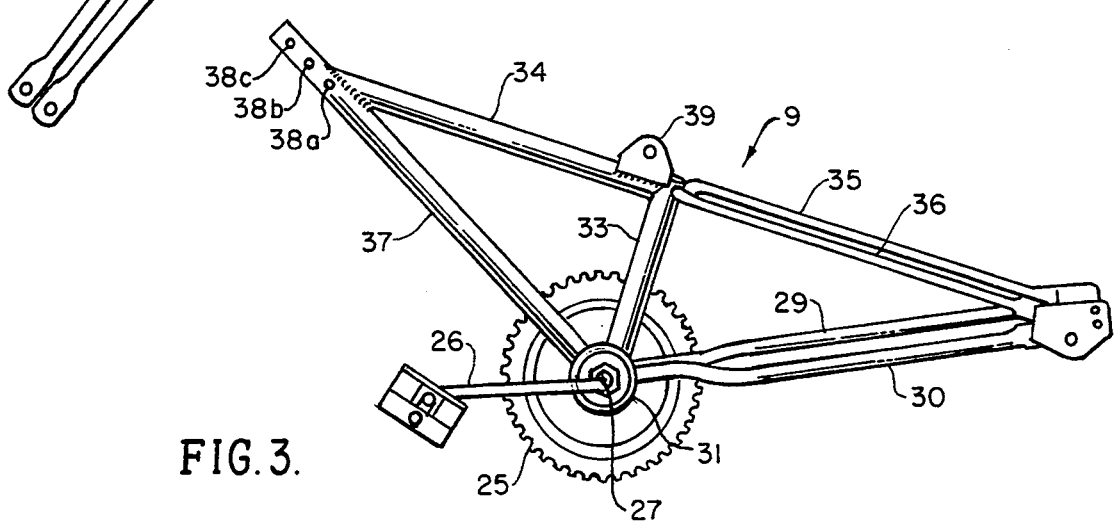
FIG. 3 is a perspective view of the rear frame of the present invention shown in FIG. 1.

The bifurcated frame assembly used in the construction of the present invention may be best understood by reference to FIGS. 1, 2 and 3. The present invention bicycle incorporates a front frame 8 and rear frame 9 which are coupled together to meet the objectives of the present invention. The front frame 8 includes the front fork 12, front wheel 10, handlebar assembly 13, steering assembly 14 and seat 15. A top tube 17 is secured between the steering assembly 14 and seat post 16. A diagonal supporting tube 18 extends forwardly and downwardly relative to top tube 17. The structural integrity of front frame 8 is provided by a securing gusset 19 which is in planar alignment with top tube 17, diagonal supporting tube 18 and seat post 16. As will be described in detail hereinbelow, a plurality of apertures 20 are laterally disposed through gusset 19 adjacent the bottom edge thereof for selectively mounting a resilient coupling between front frame 8 to rear frame 9. A pivot adjustment plate 21 is secured intermediate the forward end of diagonal supporting tube 18 and steering assembly 14, pivot adjustment plate 21 being coplanar with top tube 17 and diagonal supporting tube 18. As will be described in detail hereinbelow, pivot adjustment plate 21 defines a receiving channel bounded by a plurality of alternatively selectable apertures 22a, 22b or 22c to which rear frame 9 is pivotally coupled.

The structure of rear frame 9 may be best understood by reference to FIG. 3. Rear frame 9 is generally triangular in profile and incorporates the crank assembly 25 and pedal assembly 26. Crank assembly 25 and pedal assembly 26 are rotatable about an axis 27 which is perpendicular to the frame of the present invention bicycle. A pair of extending rear arms 29 and 30 extend rearwardly from pedal housing 31 of pedal assembly 26, extending rear arms 29 and 30 being adapted to lie on either side of rear wheel 11. A front stay 33 extends upwardly from housing 31. Center stay 34 is in axial relation to extending rear stays 35 and 36. Rear stay 35 is secured to extending rear arm 29, rear stay 36 being secured to extending rear arm 30. The forwardmost end of center stay 34 is connected to the forwardmost end of diagonal down tube 37. Center stay 34, rear stays 35 and 36, extending rear arms 29 and 30, front stay 33 and diagonal down tube 37 generally define a common planar surface. As will be described in detail hereinbelow, apertures 38a, 38b and 38c are disposed through the flap extending forwardly of the intersection of center stay 34 and diagonal down tube 37 and provide means by which the rear frame 9 is pivotally coupled to adjustment plate 21. A pair of parallel flanges 39 extend upwardly from center stay 34, the flanges 39 being adapted to mount a resilient coupling which will be described in detail hereinbelow.

The pivotal coupling between front frame 8 and rear frame 9 can be best understood by reference to FIG. 4 and FIG. 5. The pivotal coupling between front frame 8 and rear frame 9 is made at pivot adjustment plate 21. As can be best seen in FIG. 5, pivot adjustment plate 21 forms a channel between spaced, parallel panels 44 and 45, each of which has a plurality of aligned apertures 22a, 22b and 22c disposed therethrough. As stated hereinabove, the extending flange of down tube 37 forwardly of the intersection of center stay 34 and diagonal down tube 37 has a plurality of apertures 38a, 38b and 38c disposed therethrough. Apertures 38a, 38b and 38c define the alternative locations at which rear frame 9 will be pivotally coupled to one of the aligned set of apertures 22a, 22b and 22c of pivot adjustment plate 21. To change the pivotal couplings between front frame 8 and rear frame 9, a coupling 46 will be made either at apertures 22a and 38a, 22b and 38b or 22c and 38c. FIG. 5 illustrates an exemplary coupling 46 which will permit rear frame 9 to pivot with respect to pivot adjustment plate 21.

As stated hereinabove, an objective of the present invention is to provide means whereby the bicycle user can adjust the conditions at which the suspension will be activated. Generally, it is not desirable to have the suspension activated when the user is pedaling the bicycle. However, when traveling over rough terrain, a rider will typically stand upon or impose force on the pedals whereupon the bicycle suspension should absorb the shock. The plurality of aligned sets of apertures 22 and 38 provide alternative positions about which rear frame 9 will pivot relative to front frame 8. By altering the selection between aperture sets 22 and 38 by which rear frame 9 is coupled to front frame 8, the rider will be able to adjust the conditions under which the suspension will be activated. However, the angular deflection 50 between a vertical plane passing through the center of and the front wheel 10 and the pivotal coupling between the front frame 8 and rear frame 9 must not exceed 60° of arc.

An objective of the present invention is to provide a suspension system for a bifurcated bicycle frame which improves the comfort and performance characteristics of the bicycle. Referring to FIG. 6, an enlarged view of the suspension system can be best seen. As stated hereinabove, rear frame 9 is pivotally coupled to front frame 8 at pivot adjustment plate 21. The relative movement of rear frame 9 and front frame 8 during operation is controlled by a resilient coupling in the form of a shock absorber 55 coupled between gusset 19 and center stay 34. Shock absorber 55 typically comprises a conventional hydraulic damper 56 and piston 57 and a compression coil spring 58 wound around the damper 56 and contained between limiters 59 and 60. Shock absorber 55 is positioned between gusset 19 and center stay 34, damper 56 being secured to one of the apertures 20 disposed through gusset 19, piston 57 being secured between the flanges 39 which extend upwardly from center stay 34.

When road conditions cause rear frame 9 to pivot with respect to front frame 8 in a manner which causes a reduction in the distance between top tube 17 and center stay 34, coil spring 58 will be compressed. When the condition causing compression has dissipated, coil spring 58 will expand until it reaches its quiescent state. The effect of shock absorber 55 is to produce a resilient coupling which will dampen the shock caused by road conditions.

One of the objectives of the present invention is to provide the capability to adjust the suspension to compensate for the weight of the rider. To meet this objective, gusset 19 is provided with a plurality of apertures 20 adjacent its lower edge, each of which provides a selectable point for coupling shock absorber 55. Coupling shock absorbers 55 forwardly along gusset 19 will soften the suspension. As a corollary, coupling shock absorber 55 rearwardly along gusset 19 will stiffen the suspension.

The present invention provides a bicycle with substantially improved performance and suspension characteristics. By providing the ability to alter the position of shock absorber 55 relative to its coupling to front frame 8, one achieves the capability of adjusting the stiffness of the suspension to be commensurate with the weight of the rider. By providing the ability to change the location about which rear frame 9 may pivot with respect to front frame 8, the rider is able to select the conditions under which the suspension will be activated. The present invention is therefore a substantial improvement over the prior art.

We claim:

1. A bicycle comprising:
 (a) a front frame having a steering assembly coupled to a front wheel, a seat for holding a rider, a top tube secured intermediate the seat and steering assembly, a support tube secured to and extending forwardly and downwardly from said top tube, a pivot plate secured intermediate the support tube and steering assembly and having a plurality of apertures disposed therethrough forwardly from said support tube to said steering assembly and a gusset having a top and bottom edge, the top edge being secured to the top tube and support tube and including an aligned plurality of spaced apertures disposed therethrough adjacent the bottom edge thereof;
 (b) a rear frame having a crank and pedal assembly including a crank housing, said crank and pedal assembly being rotatably coupled to a rear wheel, first and second rear arms extending rearwardly from the crank housing and being disposed on either side of the rear wheel, a front stay secured to and extending upwardly from the crank housing, a pair of rear stays secured to said front stay and extending rearwardly, each of said rear stays being coupled to a respective one of said rear arms at the rear wheel, a center stay secured to the front stay and rear stays and an extension member secured to and extending forwardly from said center stay;
 (c) means for pivotally coupling the extension member of said rear frame to said pivot plate at the location of one of the apertures disposed through said pivot plate; and
 (d) resilient means for damping the relative movement between the front frame and rear frame, said resilient means being coupled between the center stay of the rear frame and the gusset of said front frame.

2. A bicycle as defined in claim 1 wherein said resilient means comprises a hydraulic shock absorber having top and bottom ends, the bottom end being secured to the center stay, the top end being secured to said gusset at the location of one of the apertures disposed through said gusset adjacent the bottom edge thereof.

3. A bicycle as defined in claim 1 wherein said rear frame further includes a diagonal down tube secured intermediate the crank housing and the intersection of the extension member and said center stay, said rear frame being coupled to the pivot plate forwardly of the intersection of said diagonal down tube and said center stay.

4. A bicycle comprising:
 (a) a front wheel and a rear wheel;
 (b) a front frame having a steering assembly coupled to the front wheel, a seat for holding a rider, a top tube secured intermediate the seat and steering assembly, a support tube secured to and extending forwardly and downwardly from said top tube, a pivot plate secured intermediate the support tube and steering assembly and having at least three pivot connections disposed therethrough forwardly from said support tube to said steering assembly and a gusset having a top and bottom edge, the top edge being secured to the top tube and support tube, and including an aligned plurality of spaced apertures disposed therethrough adjacent the bottom edge thereof;
 (c) a rear frame having a crank and pedal assembly including a crank housing, said crank and pedal assembly being rotatably coupled to the rear wheel, first and second rear arms extending rearwardly from the crank housing and being disposed on either side of the rear wheel, a front stay secured to and extending upwardly from the crank housing, a pair of rear stays secured to said forward tube and extending rearwardly, each of said rear stays being coupled to a respective one of said rear arms at the rear wheel, a center stay secured to the front stay and rear stays and extending forwardly therefrom and a diagonal down tube secured between said center stay and the crank housing, a portion of said diagonal down tube projecting beyond said stay and having at least three spaced pivot connections disposed therethrough;

(d) means for pivotally coupling said rear frame to said front frame at one of the pivotal connections of said pivot plate and said diagonal down tube; and (e) resilient means for damping the relative movement between the front frame and rear frame, said resilient means being coupled between the center stay of the rear frame and the gusset of said front frame.

5. A bicycle as defined in claim 4 wherein said resilient means comprises a hydraulic shock absorber having top and bottom ends, the bottom end being secured to the center stay, the top end being secured to said gusset at the location of one of the apertures disposed through said gusset adjacent the bottom edge thereof.

* * * * *